United States Patent

Tiirola et al.

(10) Patent No.: US 10,148,397 B2
(45) Date of Patent: Dec. 4, 2018

(54) CONTENTION BASED ACCESS IN A COMMUNICATIONS SYSTEM

(75) Inventors: Esa Tapani Tiirola, Kempele (FI); Bernhard Raaf, Neuried (DE); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 501 days.

(21) Appl. No.: 14/369,097

(22) PCT Filed: Dec. 30, 2011

(86) PCT No.: PCT/EP2011/074327
§ 371 (c)(1),
(2), (4) Date: Aug. 4, 2014

(87) PCT Pub. No.: WO2013/097909
PCT Pub. Date: Jul. 4, 2013

(65) Prior Publication Data
US 2015/0288495 A1    Oct. 8, 2015

(51) Int. Cl.
| | |
|---|---|
| H04L 5/00 | (2006.01) |
| H04W 24/10 | (2009.01) |
| H04W 74/08 | (2009.01) |
| H04W 74/00 | (2009.01) |
| H04W 72/04 | (2009.01) |
| H04W 76/14 | (2018.01) |

(52) U.S. Cl.
CPC ........... *H04L 5/0048* (2013.01); *H04W 24/10* (2013.01); *H04W 72/0406* (2013.01); *H04W 74/002* (2013.01); *H04W 74/08* (2013.01); *H04W 76/14* (2018.02)

(58) Field of Classification Search
CPC .. H04W 24/10; H04W 72/0406; H04L 5/0048
See application file for complete search history.

(56) References Cited

U.S. PATENT DOCUMENTS

| | | | |
|---|---|---|---|
| 2010/0014434 A1* | 1/2010 | Reznik | .................. H04L 1/0026 370/242 |
| 2010/0220618 A1 | 9/2010 | Kwon et al. | |
| 2010/0271968 A1 | 10/2010 | Liu et al. | |
| 2010/0290407 A1* | 11/2010 | Uemura | ............ H04W 74/0866 370/329 |
| 2010/0317382 A1 | 12/2010 | Lee et al. | |

(Continued)

FOREIGN PATENT DOCUMENTS

WO    2011/100672 A1    8/2011

OTHER PUBLICATIONS

3GPP TR 36.819 V11.0.0 (Sep. 2011); 3rd Generation Partnership Project; Technical Specification Group Radio Access Network; Coordinated multi-point operation for LTE physical layer aspects (Release 11).

(Continued)

*Primary Examiner* — Shukri Taha
(74) *Attorney, Agent, or Firm* — Brake Hughes Bellermann LLP

(57) ABSTRACT

There is provided receiving a message by a reception point of a communications system, wherein the received message comprises a message of a contention based access procedure indicating channel state information measured at user equipment from a transmission point of a plurality of transmission points.

24 Claims, 3 Drawing Sheets

(56) References Cited

U.S. PATENT DOCUMENTS

| | | | |
|---|---|---|---|
| 2011/0100672 A1 | 5/2011 | Huber et al. | |
| 2013/0016701 A1* | 1/2013 | Malladi | H04L 1/0029 370/331 |
| 2013/0028180 A1* | 1/2013 | Gao | H04W 74/004 370/328 |
| 2013/0033998 A1* | 2/2013 | Seo | H04W 24/00 370/252 |
| 2013/0044663 A1* | 2/2013 | Mohan | H04W 74/0858 370/311 |
| 2014/0177467 A1* | 6/2014 | Kim | H04W 52/242 370/252 |
| 2014/0233516 A1* | 8/2014 | Chun | H04W 24/08 370/329 |
| 2014/0348015 A1* | 11/2014 | Seo | H04W 24/10 370/252 |
| 2014/0355573 A1* | 12/2014 | Wong | H04W 72/0446 370/336 |

OTHER PUBLICATIONS

3GPP TS 36.211 V10.3.0 (Sep. 2011) Technical Specification, 3rd Generation Partnership Project; Technical Specification Group Radio Access Network; Evolved Universal Terrestrial Radio Access (E-UTRA); Physical Channels and Modulation (Release 10) / Sep. 27, 2011.

3GPP TS 36.300 V10.5.0 (Sep. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

International Search Report and Written Opinion for International Application No. PCT/EP2011/074327, dated Oct. 17, 2012, 16 pages.

Office Action for European Application 11804588.9, dated Oct. 28, 2016, 9 pages.

\* cited by examiner

CONTENTION BASED ACCESS IN A COMMUNICATIONS SYSTEM

FIELD

The present invention relates to accessing a communications network and more particularly a contention based access procedure used in accessing.

BACKGROUND

Growing demand for low-cost mobile broadband connectivity is driving the development of heterogeneous cellular networks. It is envisioned that a range of different Radio Access Technologies (RATs) and WiFi may all co-exist. It may be also possible to complement macro cells by a multitude of smaller cells, such as micro, pico and femto cells, where by the cells could use the same RAT on the same and/or different carriers. Such heterogeneous systems will be significantly more complex to manage than today's networks.

One challenge with this development is that signalling needed to manage a connection of the User Equipment (UE) to a specific RAT and/or to a specific cell either in downlink or uplink, requires signalling that may represent a considerable overhead with respect to w.r.t. data payload and latency w.r.t duration of the data session, e.g. in the case of Machine Type Communication (MTC).

Another challenge is caused by increased interference levels in the network by the increased signalling needed and/or increased density of the network due to the small cells deployed to complement the macro cells.

BRIEF DESCRIPTION OF THE EMBODIMENTS

According to an aspect of the invention there is provided a method comprising receiving a message by a reception point of a communications system, wherein the received message comprises a message of a contention based access procedure indicating channel state information measured at user equipment from a transmission point of a plurality of transmission points.

According to an aspect of the invention there is provided a method comprising transmitting a message to a reception point of a communications system, wherein the received message comprises a message of a contention based access procedure indicating a channel state information measured at user equipment from a transmission point of a plurality of transmission points.

According to another aspect of the invention there is provided an apparatus comprising at least one processor, and at least one memory including computer program code, the at least one memory and the computer program code configured to, with the at least one processor, cause the apparatus at least to perform a method according to an aspect.

According to another aspect of the invention there is provided an apparatus comprising means configured to perform a method according to an aspect.

According to another aspect of the invention there is provided a computer program product comprising executable code that when executed, cause execution of functions of a method according to an aspect.

According to another aspect of the invention there is provided a system comprising one or more apparatuses according to an aspect.

Although the various aspects, embodiments and features of the invention are recited independently, it should be appreciated that all combinations of the various aspects, embodiments and features of the invention are possible and within the scope of the present invention as claimed. Some embodiments may provide improved connection quality in early phase of connection and/or immediately after accessing a network.

Further advantages will become apparent from the accompanying description.

BRIEF DESCRIPTION OF THE DRAWINGS

In the following the invention will be described in greater detail by means of preferred embodiments with reference to the accompanying drawings, in which.

DETAILED DESCRIPTION OF THE EMBODIMENTS

Figure 1:
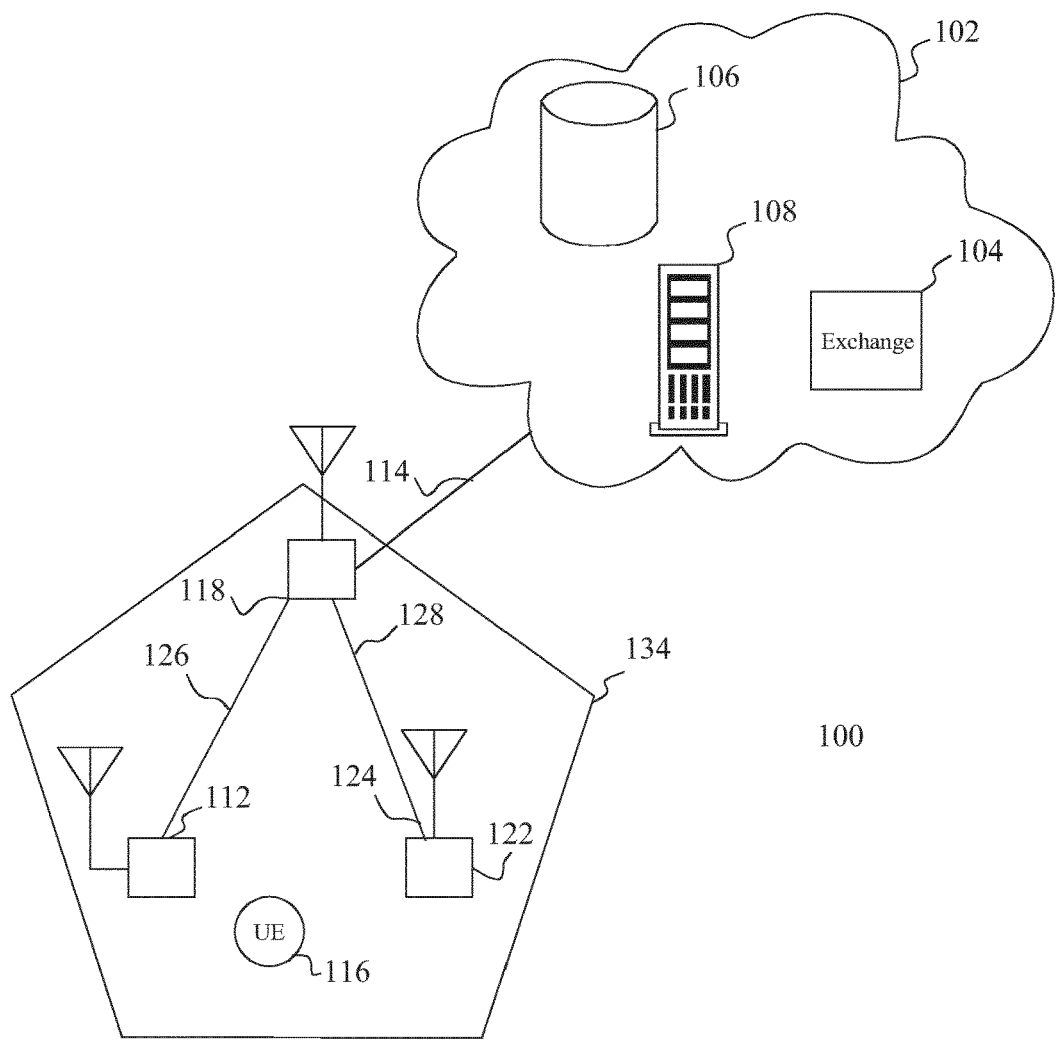
FIG. 1 illustrates a network architecture of a communications network, where UE may access the communications network according to an embodiment.

Embodiments described herein may be implemented in an LTE-Advanced communications system and more specifically to a CoMP scenario on and/or massive Multiple Input Multiple Output (MIMO) scenario having plurality of transmission/reception points configured to form a heterogeneous network comprising one or more cells.

In the following, embodiments will be described by referring to channel quality, e.g. Channel Quality Indicator (CQI). However, it should be appreciated that in the described embodiments may also be applied to Channel State Information that may comprise a rank indicator, precoding information and a CQI.

Some of the embodiments described herein may provide improvements in heterogeneous communications systems, where devices accessing the network may have limited capabilities. Examples of such devices comprise but are not limited to sensors and MTC, where a device with limited capabilities, e.g. a sensor or meter, captures an event. The event may be a temperature, inventory level, etc. The event may be relayed through the overlaying communications network that may be wireless, wired or hybrid, to an application to be translated into meaningful information. MTC may be characterized by one or more of the following properties without limiting thereto: used in low-end applications (low cost, low data rate), number of devices can be huge (control plane may be critical), Transmission (Tx) power may be limited, Number of Reception (Rx) antennas/ Rx BandWidth (BW) may be limited, power consumption may be critical e.g. due to limited battery size. Some of the embodiments described herein may provide improvements to heterogeneous networks, where macro cells are complemented by a multitude of smaller cells. The smaller cells often offer a good channel quality to the UE with less transmission power than a macro cell. Thereby, a connection established between the UE and the network is likely to be established via one or more of the smaller cells. Accordingly, if the UE is connected to the macro cell after accessing the communications network, signaling is needed to transfer the connection of the UE to one or more of the smaller cells.

Some of the embodiments herein may provide improvements to heterogeneous networks, where single cells, e.g. macro cells, are complemented by one or more transmission points having a low transmission power. The existing cells and the complementing cells may thereby form a single logical cell. Indeed, the service provided by the existing cell may be larger compared to the service area of the complementing transmission points, and include the service area of the existing cell may enclose the smaller service areas, at least to a large degree. Due to the large service area, also the transmission power used in the transmission point of the existing cell is larger than the transmission power used in the complementing transmission points. However, since the complementing transmission points may be deployed in environments where the coverage of the existing cell may be poor and/or more capacity may be needed, a channel quality to the UE is likely to be high via the complementing transmission points. Thereby, the connection to the UE is likely to be established via the complementing transmission points, when the UE is within their service area. Accordingly, if the UE is connected to the existing cell that provides large service area after accessing the communications network, signaling is needed to transfer the connection of the UE to the complementing transmission point having a smaller service area, when the UE is located in that service area.

One or more of the herein described embodiments may provide improvements related to reduced signaling related to establishing connections to a communications network. One or more of the herein described embodiments may provide improvements related to determining an uplink and/or downlink transmission points to the device accessing the communications network already during an access procedure, on the basis of radio channel conditions prevailing at the location of the device. In this way a connection to the communications network may be established after the access procedure using the determined uplink and/or downlink transmission points and without a need for further signaling to determine a transmission point or transmission points that provide a suitable channel quality.

In the following description a term transmission point is used to refer to both a device both transmitting a communications signal and a device receiving a communications signal. However, it should be appreciated that a device receiving a communications signal may also be referred to a reception point.

The Scenarios of heterogeneous networks may be categorized in various ways. One way to categorize heterogeneous networks may be via the impact on cell identity described in 3GPP TR 36.819 V11.0.0 (2011-09) Technical Report 3rd Generation Partnership Project; Technical Specification Group Radio Access Network; Coordinated multi-point operation for LTE physical layer aspects (Release 11), 5.1.2 CoMP scenarios 5.1.2, incorporated herein by reference, where in Scenario 3 each each of the transmission/reception points may form and independent cell, and in Scenario 4 all coordinated transmission/reception points are part of single logical cell, whereby each of the transmit/receive points may appear as eNB antenna ports in that cell.

In the embodiments described herein a communications signal may refer to a signal communicated between two communicating entities, e.g. apparatuses or devices, such as a transmission point and UE. The communications signal may comprise a message of a communications channel. The communications channel may comprise a common channel shared between devices or a dedicated channel with dedicated resources for a communicating device. Examples of the communications channels include but are not limited to a Physical Random Access Channel (PRACH), Physical Uplink Shared Channel (PUSCH) and Physical Downlink Shared Channel (PDSCH).

FIG. 1 shows simplified system architecture of a communication system according to an embodiment only showing some elements and functional entities, all being logical units whose physical implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication as such, are irrelevant to the actual invention. Therefore, they need not be discussed in more detail here.

In the network architecture 100 in FIG. 1 is presented an infrastructure network 102 that may be accessed via eNBs 112, 122 and 118. The eNBs 112, 122 and 118 may provide radio signal coverage in their respective coverage areas. User Equipment (UE) 116 may reside in the coverage area of one or more of the eNBs.

A pentagon 134 illustrates a service are provided by the eNBs 112, 122 and 118. The service area may comprise an area defined by a radio signal coverage area, where UE may communicate in uplink and/or in downlink with one or more or all of the eNBs. Accordingly, the actual shape of the service area may not be a pentagon as illustrated but the shape may vary depending on the environment surrounding the eNBs, when deployed.

The service are may comprise a single cell having a cell identifier. Accordingly, all the eNBs may belong to the same cell. In another example all or a part of the eNBs may provide separate cells (not shown) that each may be identified by a cell identifier specific to the cell.

In an embodiment the UE 116 resides within the coverage areas of both eNBs 112, 122 and may communicate wirelessly with the eNBs 112, 118 and 122.

In an embodiment, the eNB 118 may connect to the infrastructure network via a connection 114. The eNB 112 and 122 may connect to the eNB 118 on connections 126 and 124.

The connection between the eNBs may be X2 connection, for example. There can be also some other standardized on non-standardized connection between the eNBs/RRHs. The connection between the eNBs may provide transmission of data and signalling between the eNBs. Thereby, data and/or signalling of the UE within a coverage area of the eNB 112 or eNB 122 may be forwarded on the connection between the eNBs. In this way the data and/signalling to/from UE may be transmitted via both the eNBs.

The infrastructure network may be a core network comprising one or more exchanges 104, databases 106 and application servers 108 that provide services to the UE connected to the network via ENBs 112, 122 and 118. The connections 124 and 126 may employ different or the same technologies. Examples of the technologies comprise, but are not limited to, Internet Protocol (IP) and E1. Connections between the exchanges, databases and application servers in the infrastructure network may employ the same technologies as connections 124 and 126, or they may be different.

The database 106 may store subscriber data such as subscriber identifier and group identifiers associated with the subscriber. The stored subscriber data may be used to identify the UE connecting to the network.

The application server 108 may comprise service logic for providing one or more services in the network. The application server may also provide storage for application specific data. Accordingly, the application server may host applications that provide the services.

The switch 104 may comprise signalling means and other functional units that enable subscriber lines, telecommunication circuits and/or other functional units to be interconnected as required by individual users. A switch may also include the function of the router. Accordingly, the switch may be configured to route Internet Protocol (IP) packets.

The connections in the embodiments may be wired or wireless. A wireless connection may be implemented with a wireless transceiver operating according to the Long Term Evolution (LTE), LTE-Advanced, GSM, WCDMA (Wideband Code Division Multiple Access), Direct Sequence-CDMA (DSCDMA), OFDM (Orthogonal Frequency Division Multiplexing), WLAN (Wireless Local Area Network), WiMAX (Worldwide Interoperability for Microwave Access) or Bluetooth® standard, or any other suitable standard/non-standard wireless communication means. A wired connection may be implemented for example using Asynchronous Transfer mode (ATM), Ethernet, E1 or T1 lines.

In an embodiment, the communications network 100 may comprise an LTE-Advanced communications system.

In an embodiment, a transmission point may refer to a unit performing a transformation of a communications signal between a baseband frequency and a RF, and transmitting and/or receiving a communications signal on a communications channel. Accordingly, a transmission point may only include RF parts. The baseband processing of communications signals may be performed in a centralized unit separate from the transmission point. Accordingly, in one example, a transmission point may comprise a Remote Radio Head (RRH).

In an embodiment, a plurality of transmission points may be arranged to collaborate by having combined baseband processing of communications signals. The combined baseband processing may be performed by a centralized unit that processes baseband communications signals of a plurality of transmission points. This may be referred to as Collaborative Multi-Point (CoMP) scenario.

In CoMP scenario the central processing of baseband communications signals may provide a relatively small size of a transmission point that only includes the RF parts, thus the transmission point may not perform any baseband processing. In this way the deployment of the transmission points becomes easy and a coverage area of a communications network may be flexibly extended and/or complemented by deploying transmission points to areas, where improved network coverage may be needed, e.g. in an area of poor coverage and/or area of high traffic load.

In an embodiment a centralized unit in CoMP may comprise an eNB including both the RF parts and a baseband processing unit that performs centralized processing of baseband communications signals of transmission points connected to it. Accordingly, an eNB may be upgraded to support CoMP so that the baseband unit of the eNB may support baseband processing of communications signals for one or more transmission points.

In another example a centralized unit in CoMP may comprise a separate unit from an eNB without any RF parts.

In an embodiment a centralized unit in CoMP may include a functionality to manage transmission points connected to the centralized unit. The managing may include controlling transmission and/or reception of communications signals between UE and the transmission points. Accordingly, the centralized unit may determine one or more transmission points via which communications signals may be transmitted to UE and/or one or more transmission points via which communications signals may be received from UE.

It should be appreciated that a transmission of a communications signal from a transmission point to UE may refer to a downlink communications.

It should be appreciated that a transmission of a communications signal from a UE to a transmission point may refer to an uplink communications.

In an embodiment each of the eNBs 112, 118 and 122 may comprise a transmission point. The transmission points may comprise Collaborative Multipoints (CoMPs), whereby baseband processing for all the eNBs may be performed by a centralized processing unit deployed with the transmission point 118. Accordingly, each of the transmission points 112 and 122 may only have the RF parts and constitute RRHs connected to the eNB 118. The baseband frequency signals may be communicated over connections 126 and 124 between the eNBs. In another example (not shown in FIG. 1) a central baseband processing unit may be deployed separately from all the eNBs and connected to all the eNBs, whereby baseband processing of communications signals of all the eNBs would be performed by the central processing unit. With a separate central processing unit all the eNBs 112, 122 and 118 could only include the RF parts.

In an embodiment, the eNB 118 employs a high transmission power and the eNBs 112 and 122 employ low transmission powers. The eNBs 112 and 122 may be deployed to complement the cell provided by the eNB 118. Accordingly, the eNB 118 may provide an "umbrella" that encloses the coverage areas of the eNBs 112 and 122. In this way improved coverage may be provided in smaller areas by the eNBs 112 and 122 within the large service area provided by the use of high transmission power at the eNB 118.

A central baseband processing entity may be provided by a baseband processing unit of a single eNB, e.g. eNB 118 of FIG. 1, being connected to one or more transmission points, e.g. eNBs 112 and 122. Thereby the, eNB 112 and eNB 122 may operate as transmission points without needing any baseband processing unit.

Figure 2:
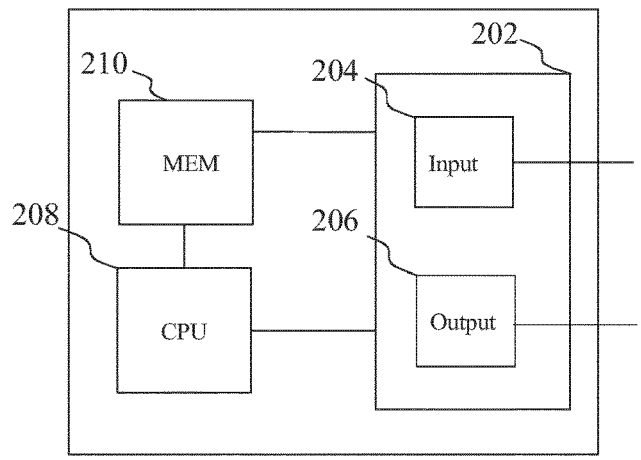
FIG. 2 illustrates an apparatus according to an embodiment.

FIG. 2 is a block diagram of an apparatus 200 according to an embodiment of the invention. The apparatus may comprise a central baseband processing unit, UE or eNB described in the embodiments. Although the apparatus has been depicted as one entity, different modules and memory may be implemented in one or more physical or logical entities. Examples of the apparatus include but are not limited to UE, a mobile phone, communicator, PDA, application server or a computer.

The apparatus 200 comprises an interfacing unit 202, a central processing unit (CPU) 208, and a memory 210, that are all being electrically interconnected. The interfacing unit comprises an input 204 and an output unit 206 that provide, respectively, the input and output interfaces to the apparatus. The input and output units may be configured or arranged to send and receive data and/or messages according to one or more protocols used in the abovementioned communication standards. The memory may comprise one or more applications that are executable by the CPU.

The CPU may comprise a set of registers, an arithmetic logic unit, and a control unit. The control unit is controlled by a sequence of program instructions transferred to the CPU from the memory. The control unit may contain a number of microinstructions for basic operations. The implementation of micro-instructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

An embodiment provides a computer program embodied on a distribution medium, comprising program instructions which, when loaded into an electronic apparatus, cause the CPU to perform according to an embodiment of the present invention.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The apparatus 200 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 200, necessary processing capacity, production costs, and production volumes, for example.

In an embodiment the input unit may provide circuitry for obtaining data, signalling, signalling messages and/or transmissions to the apparatus. The obtaining may comprise receiving radio frequency signals from an antenna, for example. In another example the obtaining may comprise receiving baseband signals from an RF unit. Accordingly, data, signalling, signalling messages and transmissions in embodiments of the present disclosure may be provided as RF signals or baseband signals.

In an embodiment the output unit may provide circuitry for transmitting data, signalling, signalling messages and/or transmissions from the apparatus. The transmitting may comprise transmitting radio frequency signals from an antenna, for example. In another example the transmitting may comprise transmitting baseband signals to an RF unit. Accordingly, data, signalling, signalling messages and transmissions in embodiments of the present disclosure may be provided as RF signals or baseband signals.

It should be appreciated that in an embodiment, the one or more parts described in the apparatus 200 may be provided as separate physical entities.

For example, according to an embodiment, the interfacing unit may be provided as a separate unit that constitutes a transmission point that communicates on RF communications signals on a communications channel and on baseband frequency communications signals on a connection to a centralized baseband processing unit. The interfacing unit may provide transmission or reception, or both transmission and reception of RF signals on the communications channel and/or on the connection to the centralized baseband processing unit.

Figures 3, 4:
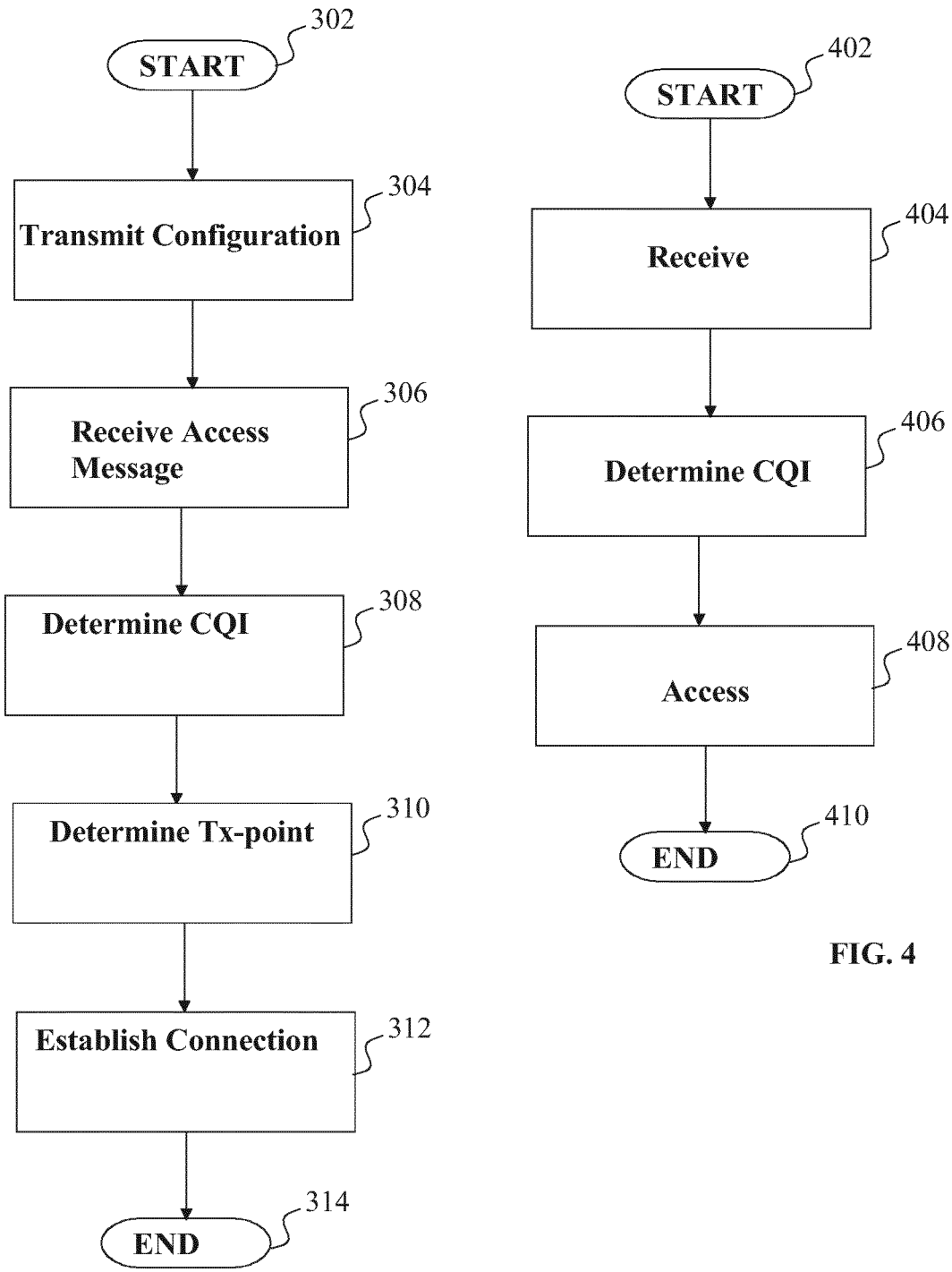
FIG. 3 illustrates a method of providing access to a communications network according to an embodiment.
FIG. 4 illustrates a method of accessing a communications network according to an embodiment.
Figure 6:
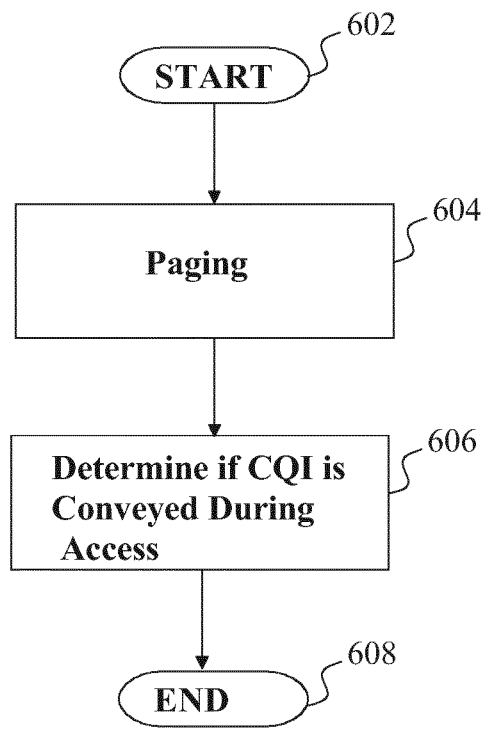
FIG. 6 illustrates a method of accessing a communications network, when the UE is paged, according to an embodiment.

FIGS. 3, 4, and 6 illustrate accessing a communications network, according to an embodiment, where operations performed by a network node coordinating a plurality of transmission points in a communications network, e.g. a centralized baseband processing unit or eNB, may be referred to simply as operations performed at the "network" or "network side".

The methods of FIGS. 3, 4 and 6 will now be explained with reference to each of the FIGS. 3, 4, and 6 and FIG. 5 illustrating an association between reference signals used by transmission points and preambles when providing access in a communications network according to an embodiment.

FIG. 3 illustrates a method of providing access to a communications network according to an embodiment. The method may be performed by a network node coordinating a plurality of transmission points in a communications network. The network node may comprise an eNB or a centralized baseband processing unit described earlier, for example. An example of such a network node is illustrated in FIG. 2.

The method starts in 302, where each of the plurality of transmission points may be configured with a reference signal or a group of reference signals. The reference signals configured to each transmission point may be transmitted to enable UE to measure channel quality in downlink from the transmission points on the basis of the reference signal transmitted by each of the transmission points.

In an embodiment, the transmission points may belong to a single cell or to different cells. Transmission points in different cells may be configured with the same reference signal. However, one part of transmission points and another part of transmission points in the same cell may be configured with different reference signals to provide separation of the transmission points at the UE.

In 304, information of reference signals associated with each of the transmission points may be transmitted to the UE. The information may be transmitted in a System Information (SI) message for example. In one example an existing SI message may be extended or a new SI message including the information may be used.

The SI may include information for UE to access to the network. Examples of the information include: frequency band information such as uplink band and/or downlink band, Time Division Duplex configuration, radio resource configuration common to all UEs in the cell (e.g., Radio Access Channel configuration, Physical Uplink Control Channel (PUCCH) configuration, Physical Uplink Shared Channel (PUSCH) configuration, Physical Downlink Shared Channel (PDSCH) configuration etc.), and cell-reselection information.

Figure 5:
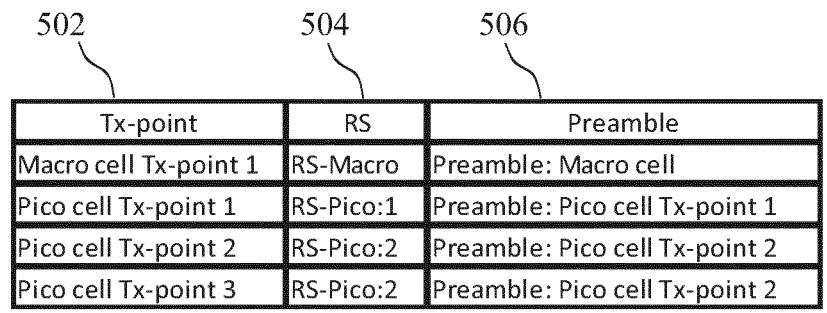
FIG. 5 illustrates association between reference signals used by transmission points and preambles when providing access in a communications network according to an embodiment.

The information transmitted in 304 may comprise a configuration as illustrated e.g. in FIG. 5 and fields 502 and 504, where a transmission point may be associated with a reference signal.

In an embodiment, the configuration of reference signals may comprise associating a group of transmission points with a group of reference signals. Each of the transmission points may be associated with a specific reference signal from the group. To provide identifying a transmission point from other transmission points to the UE, each transmission point may be configured with a separate reference signal.

Accordingly, as can be seen from the configuration of FIG. 5, Pico cell transmission point (Tx-point) 1 may be configured a reference signal (RS) 1 from a group of reference signals for pico cells, RS-pico 1, and Tx-point 2 may be configured a RS-pico 2 from the same group. In this way the UE may be provided separation of RSs received from different Tx-points.

In an embodiment, the configuration of reference signals may comprise associating a group of transmission points with a group of reference signals. Each of the transmission points may be associated with a reference signal from the group. However, some Tx-points may use same reference signals. This is illustrated in the example of FIG. 5, where Tx-point 2 and Tx-point 3 are configured with the same RS, RS-pico 2. Although, the RS-pico 2 does not provide separation between the Tx-point 2 and Tx-point 3, UE may use the RS-pico 2 transmitted from Tx-point 2 and Tx-point 3 to differentiate between different groups of Tx-points. In the example of FIG. 5, at least the Tx-points belonging to pico cell and a macro cell may be differentiated since the RS of the macro cell TX-point is RS-macro or belongs to a group of RS signals RS-macro, and the pico cells are configured with RS signals from the group of reference signals RS-pico.

Now referring back to FIG. 3, in 306, a message may be received by a first transmission point of a plurality of transmission points in a communications system, wherein the received message comprises a message of a an access procedure of accessing a communications network. The access procedure may comprise a contention based access procedure or a non-contention based access procedure, for example a Contention Based Random Access Procedure and Non-contention based random access procedure as described in 3GPP TS 36.300 V10.5.0 (2011-09) Technical Specification3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Sections 10.1.5.1 and 10.1.5.2. The message may indicate a downlink channel quality measured at user equipment from a second transmission point of the plurality of transmission points.

In an embodiment, a plurality of different messages of the access procedure may be received in 306. The messages may comprise e.g. a first message that comprises a preamble and a second message following the first and used for contention resolution. The second message may further include a connection request, e.g. RRC connection request. In one example, the plurality of messages may comprise the first, Random Access (RA) 1 message, and the second, RA 3 message, transmitted from the UE in the 3GPP TS 36.300 V10.5.0 (2011-09) 10.1.5.1 Contention based random access procedure.

In an embodiment the message may be received by a plurality of transmission points.

In 308, a channel quality of the uplink channel on the basis of the received 306 message may be determined. A Channel Quality Indicator (CQI) may be determined from the received message. The CQI may comprise e.g. signal strength of the received message.

In an embodiment, where the message is received 306 via a plurality of transmission points, an uplink channel quality of each of the messages may be determined.

In an embodiment, a channel quality of the downlink channel on the basis of the received message may be determined 308. The message may include an indication of a transmission point providing the UE downlink channel quality matching to a criterion used by the UE. The criterion may comprise the downlink channel via a specific transmission point or a group of transmission points providing the UE a best CQI, e.g. best signal strength.

Accordingly, in one example, when the received message includes an indication of a transmission point providing the UE downlink channel quality matching to a criterion used by the UE may also indicate that the UE may have performed channel quality measurements, e.g. measurements of reference signals corresponding to one or more transmission points.

The indication may comprise a preamble 506 configured to be associated with a transmission point or a group of transmission points, e.g. a macro cell preamble or pico cell preamble, of FIG. 5.

In 310, a transmission point of the plurality of transmission points for an uplink channel of the user equipment may be determined. The determining may comprise selecting the transmission point of the plurality of transmission points that provides the best CQI determined in 308. The best CQI may relate to instantaneous quality from at least one transmission point to the user equipment. By determining the transmission point for an uplink channel of the user equipment during the access procedure, the connection may be directly established in 312 in the uplink via the determined transmission point without further signalling e.g. related to determining the uplink channel conditions at the UE.

In an embodiment, in 310, a transmission point for a downlink channel of the user equipment may be determined. The indication of downlink channel quality received 306 in the message may indicate a transmission point or a group of transmission points from the plurality of transmission points. When a single transmission point is indicated, the indicated transmission point may be determined as the transmission point for the downlink channel of the UE.

When a group of transmission points is indicated 306, e.g. Tx-points 2 and 3 in FIG. 5 that are associated with the same preamble in 310, in 310 a TX-point may be determined from the indicated group. In such a case the determining may comprise e.g. determining a traffic load of the indicated transmission points and selecting the transmission point for the downlink channel for the UE that has the least load or has still capacity to serve the UE.

In another example of when a group of transmission points is indicated 306, e.g. Tx-points 2 and 3 in FIG. 5, a TX-point from a group of TX-points may be determined based on the determined 308 uplink channel quality. Accordingly, a channel quality, e.g. CQI, of the uplink channel on the basis of the received 306 message may be determined and the TX-point that has the highest CQI for the received message from the indicated group may be determined as the Tx-point for the downlink channel of the UE. In this way the Tx-point may be selected at least when a transmission power of all the Tx-points in the indicated group is the same.

By determining the transmission point for a downlink channel of the user equipment during the access procedure, the connection may be directly established in 312 in the downlink via the determined transmission point without further signalling e.g. related to determining the downlink channel conditions at the UE.

In one example, the reference-signals 504 associated with the transmission points 502 comprise a plurality of groups of reference signals associated with different transmission points and the downlink channel quality indicated by the received message 306 indicates one group of reference signals. In this way the group of reference signals may indicate a group of transmission points. This is illustrated in FIG. 5 e.g. the preamble Pico cell TX-point 2 being used to indicate that RS-Pico 2 used by Tx-point 2 and Tx-point 3 gives a channel quality matching a criterion used by the UE.

In one example, the channel quality indicated by the received 306 message comprises a signature sequence of the access procedure. The signature sequence may be associated with a group of transmission points. One example of the signature sequence comprises a preamble. This is illustrated in FIG. 5, where the preamble Pico cell TX-point 2 being used to indicate RSs used by both Tx-point 2 and Tx-point 3.

In an embodiment, the message of the access procedure may be received 306 via different transmission points. The message is thereby received on a plurality of different uplink channels. Then, a set of transmission points may be determined 310 for providing uplink channels to the UE. The determining may comprise determining 308 channel qualities of the messages received 306 via the plurality of transmission points and comparing the determined channel qualities. The channel qualities may be compared e.g. to each other or against a threshold. When the channel qualities are compared to each other a transmission point providing the highest channel quality may be selected into the set. Accordingly, the set of transmission points may be determined to include one transmission point that may have the highest channel quality. When the channel qualities are compared against a threshold, the set of transmission points may include more than one transmission point that satisfy on or more criteria, e.g. an error rate, signal strength, uplink pathloss, CQI.

In an embodiment, the access procedure may include a plurality of different messages of the access procedure from the user equipment, wherein said received messages include channel quality information. These messages may comprise e.g. the RA 1 and RA 3 described earlier. The channel quality information may be included e.g. as a preamble associated with an RS as described earlier and illustrated in FIG. 5. The plurality of messages may be needed for example due to contention resolution during the accessing, when a contention based access procedure is used. Then each of the messages received 306 from the UE may be used to determine 308 channel quality and TX point 310 for downlink and/or uplink channel of the UE. Depending on the applied transmission scheme, eNB may select a set of Tx points for transmission, based on received 306 channel state information, the channel quality information. In an embodiment, where the access procedure includes a plurality of different messages each of the messages may indicate a channel quality measured according to best-M scheme. The M may be defined by the number of messages of the access procedure used to deliver the channel quality information. For example, multiple channel state information messages, each corresponding to Tx—point specific CSI measurement according to best-M scheme can be conveyed as part of RA 3. In this way in 310, more than a transmission point may be determined on the basis of each of the received messages and the UE may be provided more than one Tx-points in downlink. When more than one transmission point is determined for the UE, the eNB can apply coordinated transmission multiple-input-multiple-output (MIMO) transmission over multiple transmission points to the UE.

In an embodiment the communications network may store a configuration of an uplink transmission point and a downlink transmission point used for connecting the UE, when the UE previously was connected to the communications network. However, the previous configuration may not be valid for the UE when the UE accesses the communications network to establish a new connection, if the UE has e.g. moved so that the channel qualities of the previously used transmission points do not correspond to measured channel qualities from the transmission points at the new location of the UE. The UE may have even moved out of coverage of one or more of the transmission points.

Therefore, in an embodiment, in 310, it may be determined whether a previous configuration of transmission points for the UE is still valid or if a new one should be determined. The determining may in 310 comprise deriving a preamble from the message received in 306 and comparing the derived preamble with a preamble associated with the transmission point previously configured to the UE in downlink. Then if the preambles match, the previous configuration of transmission points may be still be used. When the preambles do not match, the previous configuration may not be used and any stored previous CQI information may be discarded or at least correctness of the previous CQI information may need to be confirmed.

In an embodiment, a channel quality of the plurality of messages may be measured to determine 310 an uplink transmission point for the UE. The uplink transmission point may be thus determined as a transmission point of a specific cell from different cells available to the UE. The uplink transmission point may be determined as the transmission point that gives the best CQI of the message from the UE. A downlink transmission point may be determined 310 on the basis of the channel quality information received 306 in the messages from the UE. In one example a downlink transmission point may be determined from the same cell as the determined uplink transmission point. Accordingly, the determined uplink transmission point may be used to determine a cell, thus the cell the determined uplink transmission point belongs to. Then the downlink transmission point may be determined as a transmission point of the same cell as the uplink transmission point. Accordingly, the channel quality information, e.g. a preamble, included in the message from the UE received 306 via the determined 310 uplink transmission point, may be used to determine the downlink transmission point.

In 312, a connection to the user equipment after the user equipment has been granted access may be established. The granting of access may comprise one or more messages, where the UE is assigned an identifier. The identifier may be specific to a cell, e.g. a Cell Radio Network Temporary Identifier (C-RNTI).

The connection may provide the UE uplink communications via a transmission point determined on the basis of channel quality measured from a message from the UE, said message received during the contention based access. The uplink communications on the connection may be provided via a transmission point determined on the basis of the downlink channel quality indicated by the received message from the UE. The connection may comprise a control plane connection e.g. an RRC connection, and/or a user plane connection for carrying user data between the network and the UE.

Accordingly, it should be appreciated that a TX-point via which uplink communications is provided to the UE may be determined on the basis of CQI measured for the whole message received during an access procedure, whereas information indicating the TX-point to be used in downlink communications or information to determine a TX-point to be used in downlink communication may be derived from a preamble included in the message received in 306.

The process ends once the UE has been established a connection. This may be after the UE has been granted access and the UE may be identified by the network at the network node that allocates resources to the UE on a communications channel over the air interface. Accordingly, the UE may be identified on the air-interface connection.

FIG. 4 illustrates a method of accessing a communications network according to an embodiment. The method may be performed by user equipment, when the UE is within a coverage area of at least one transmission point of a plurality of transmission points in a communications network. An example of such the UE is illustrated in FIG. 2.

The method starts in 402, where the UE may be synchronized to a downlink radio signal transmitted by at least one of the transmission points. In Synchronization, the UE acquires time and frequency synchronization with a cell and may detect the physical layer Cell ID of that cell. When the UE is synchronized, it may determine a configuration of an access channel to be used to access the communications network. The access channel may comprise an access channel of a contention based access, e.g. a Physical Random Access Channel (PRACH).

In 402, the UE may be in a state, where it is not connected to the communications network, but anyway switched on and synchronized to a downlink radio signal transmitted by at least one of the transmission points so that it may receive information from the communications network. The information may comprise access related information for accessing a cell of the communications network, for example. The UE may determine a configuration of an access channel to be used to access the communications network on the basis of the received information. The access related information may comprise an identifier of the communications network, e.g. PLMN identifier, a tracking area code and/or a cell identity. The information may be received e.g. in a System Information (SI) transmitted from a transmission point, for example. In this way the UE may identify one or more available communications networks and/or cells that it may access. The accessing of a communications network may be needed for example, when there is an incoming transmission of data or an incoming call to the UE from the network, or when the UE itself has data to be transmitted or an outgoing call to the network.

In an embodiment, in 402, the UE may be in an RRC_IDLE state.

In 404, access related information may be received from one or more transmission points, where the UE is synchronized to receive SI. Accordingly, there is no connection needed to the network, but the reception of the information may be performed before the network is accessed and/or a connection is established.

In an embodiment in 404, a reference signal from a transmission point may be received. The reference signal may be received from each transmission point, where the UE is synchronized to receive a downlink radio signal. Accordingly, in one example, the UE may be synchronized to a single cell comprising a plurality of transmission points. In another example, the UE may be synchronized to a plurality of cells comprising a plurality of transmission points. In the example of a plurality of cells, the reference signal may be received as part of neighbouring cell measurement, for example.

In an embodiment, the UE may have received receive information of reference signals 504 associated with each of the transmission points 502 during a previous connection to the network. The information may be received from the network via any one of the transmission points, for example. Then, when receiving a reference signal in 404, when synchronized to a downlink radio signal, the UE may associate the received reference signal to a specific transmission point 502 and/or a group of transmission points.

Accordingly, it should be appreciated that, it may not be needed for the UE to receive information of reference signals associated with each of the transmission points in connection with the access procedure. Indeed, the information may be already stored in the UE. This may be the case when the UE has been turned off, and afterwards switched on, whereby the stored information may be used in the present method of accessing a communications network. The information may be stored in the UE from a previous connection to the network, e.g. a voice call.

In 406, a channel quality of one or more transmission points of the plurality of transmission points may be determined. The determining may be performed by the UE measuring the one or more reference signals it has been provided either from the network or as pre-stored, as explained previously.

In an embodiment, where the communications network comprises more than one cell, the UE may measure the reference signals of the neighbouring cells.

In an embodiment, the channel quality determined in 406 may comprise a Channel Quality Indicator (CQI) for he measured reference signals. The CQI may be determined for example by using existing measurement setups of the CQI, including e.g. best-M scheme. The Best-M is a specific Channel State Information (CSI) compression scheme supporting frequency domain scheduling. In this context, we could have CSI-reporting such as best-M corresponding to multiple cells/Tx-points.

The reporting compression in Best-M scheme is based on identifying those frequency portions, which have the highest CQI values. The parameter M represents the number of frequency portions with the highest CQI values to be identified. The M frequency portions may be reported individually (Best-M individual) or as an average (Best-M average) depending on the implementation of the scheme. The reporting for the remaining (unclaimed) frequency portions with the lowest CQI values may be done by calculating the average CQI among the remaining frequency portions.

In an embodiment, the measurement setup used 406 to determine CQI may comprise a best-M scheme, where the M may be determined on the basis of messages used to deliver the network channel quality information during the access procedure.

In 408, the channel quality determined in 408 may indicate a transmission point of the plurality of transmission points, and the indicated transmission point may be determined as the transmission point for a downlink channel of the user equipment. The transmission point may be determined e.g. by channel quality determined in 406 from a transmission point exceeding a threshold. The threshold may comprise a block error rate and/or one or more other measured channel qualities. In one example the threshold may be set by each channel quality determined in 406 that exceeds the previously determined, when channel quality is measured in 406 from a plurality of RSs. Thereby, in one example, in 408 the transmission point may be determined by the reference signal measured in 406 to give the highest channel quality.

Accordingly, the transmission point may be determined in 408 by the association of a reference signal or a group of reference signals 504 to a transmission point or a group of transmission points 502. Then the measured reference signal giving the highest channel quality in 406 may indicate the transmission point.

It should be appreciated that, in certain operational scenarios of the UE, the information of reference signals 504 associated with each of the transmission points 502 may not need to be received at all. This may be happen, for example, when the UE resides within a private network and/or in a restricted area, where the transmission points remain the same. Then, the information of reference signals associated with each of the transmission points may be preconfigured to the UE by the operator or a manufacturer of the UE.

In one example the information of reference signs associated with Tx-points 502 may be provided on a module such as a Subscriber Identity Module (SIM) that may be provided by the operator of the private network. Then, when the module is connected to the UE to enable accessing to the private network, the information may be accessed by the UE and used for example as described in the embodiments herein.

In 408, the UE may access the network by transmitting a message to a first transmission point of a plurality of transmission points in a communications system. The transmitted message may comprise a message of a contention based access procedure indicating a downlink channel quality measured 406 at user equipment from a second transmission point of the plurality of transmission points.

Accordingly, it should be appreciated that the reception point the message transmitted in 408 is received may not be the same as the transmission point associated with the channel quality indicated in the message. For example, the message may be received in macro cell reception point, and the message indicates a channel quality measured from a pico cell transmission point. For example with reference to FIG. 5, the message transmitted 408 by the UE could be received via the Tx-point 2 and indicating a channel quality of Macro cell Tx-point 1. Indeed, since a transmission power of a pico cell is smaller than the transmission power of a macro cell, a good channel quality may be measured at the UE from the TX-point of the pico cell even of the path loss would be low. When the channel quality of the macro cell is indicated to the network during the access procedure, before a connection is established, the connection may be established following the access directly using the macro cell, without any further signalling related to selection of an optimal transmission point.

It should be appreciated that a uplink channel quality from a reception point close to a UE is likely to be better than a reception point that is far away. Reception points that are deployed to complement an existing cell that provides a large coverage area by using a high transmission power may provide a better uplink channel quality to the UE compared to the existing cell. The existing cell may comprise e.g. a macro cell. Therefore, when the channel quality of a transmission point using a high transmission power is indicated to the network, and e.g. the transmission point with low transmission power, during the access procedure, before a connection is established, the connection may be established following the access directly using the transmission point using the high transmission power, without any further signalling related to selection of optimal transmission point.

Accordingly, in 408, the message may be transmitted to a transmission point or transmission points the UE is synchronized to. The message may be transmitted on an access channel the UE has determined in 402. In an embodiment, in 408, the UE may include in the transmitted message a preamble associated with a reference signal or a group of reference signals determined 406 to give the highest channel quality. The preamble may be a preamble from a group of preambles associated with a reference signal or a group of reference signals. Then the UE may select the preamble randomly from the group of preambles to indicate that the reference signal or a group of reference signals gives the highest channel quality.

It should be appreciated that also one or more other criteria than the highest CQI of a reference signal may be used in determining 406 a transmission point. An example of such criterion is downlink path loss.

Accordingly, it should be appreciated that reference-signals 504 may be associated with one or more transmission points 502 and comprise a plurality of groups associated with different transmission points. Thereby an access message indicating a channel quality measured by the UE may indicate one group of reference signals. In this way transmission points located in similar environments e.g. nearby each other and/or having a similar size service area, may transmit reference signals from the same group, and no dedicated reference signals for every transmission point may be needed. Thereby, a smaller number of reference signals may be needed than if every transmission point would have its own. The service area may be similar, e.g. for TX-points using similar power levels, e.g. TX-points of pico cells that use low power levels.

In one example of transmission points 502 being associated with reference signals 504 from different groups, a transmission point providing a large coverage area, e.g. a Macro Cell TX-point 1 in FIG. 5, may use a different group of reference signals than a transmission point providing a smaller coverage area, e.g. Pico cell Tx-point 1.

Referring now to both FIGS. 3 and 4, in an embodiment, where UE determines in 406 a reference signal that matches one or more of its criteria, e.g. gives the highest channel quality, the UE may transmit a message comprising a preamble associated with a group of reference signals, where the reference signal matching the criteria belongs to. In this way at the network side may be determined 308 from the received message a transmission point or a group of transmission points that use the reference signal or a group of reference signals indicated by the preamble. Accordingly, when the preamble is associated with a group of reference signals used by one or more transmission points, that information may be used as described in step 310 in the method of FIG. 3 to determine a downlink transmission point for the UE.

It should be appreciated that a message transmitted on an access channel in 408 of FIG. 4 may be a first message of a plurality of messages transmitted during an access procedure. These further messages may be needed in a contention based access procedure for contention resolution.

According to an embodiment, when more than message is transmitted 408 from the UE on an access channel, the first message may include a preamble as described earlier and also further messages may include information of the channel quality measured 406 in the UE. In this way the network may be provided more information of the channel quality and even information of the channel quality at different time instants, when the information is delivered in more than one message. This gives the network more detailed information of the channel quality at the UE, and the accuracy of determining TX-points, e.g. in step 310 of FIG. 3, may be improved.

In 410, the method may end when a connection may be established to the network. The connection may be established after the UE may be identified by the network node that allocates resources on a communications channel over the air-interface. The identifier may be received by the UE from the network and the identifier may comprise e.g. a C-RNTI, for example.

In an embodiment, when the UE determines a channel quality as described in the step 406 of the method of FIG. 4, no more measurement may be needed by the UE even during a connection of the UE established following the accessing. That is, if the UE does not move or its radio channel in uplink or downlink does not significantly change due to other reasons.

In an embodiment, a transmission point of a macro cell may comprise a transmission point transmitting at a high power level, and a transmission point of a smaller cell, e.g. pico cell, may transmit at a low power level. Accordingly, the transmission point of a macro cell may refer to a high power transmission point and the transmission point of the smaller cell to a lower power transmission point.

In an embodiment reference signals may be grouped into a plurality of groups, thus at least two groups. The groups may be formed on the basis a specific transmission point or a group of transmission point each of the groups of reference signals is associated to. In one example, the groups of reference signals may be associated to different transmission point on the basis of transmission power levels used in the transmission points. Accordingly, high power transmission points may be associated with one group of reference signals and low power transmission points may be associated with another group of reference signals. It should be appreciated that also a single high power transmission point may and a lower power transmission point may be associated to different groups of reference signals. It should be appreciated that a single group of reference signals may comprise one or more reference signals.

In an embodiment the determining of the channel quality in 406 may comprise measuring reference signals according to a measurement setup. The measurement setup may be predefined and stored in the UE. This may be, when the measurement setup comprises information of reference signals associated with each of the transmission points are stored in the UE. The measurement setup may further comprise information regarding an amount of channel quality information to be delivered during the access procedure. Accordingly, the measurement setup may comprise an indicator of a number of messages available for delivering channel quality information to the network during the access procedure. Furthermore, it may define the type of channel state information measurement applied in current setup.

In one example, the measurement setup may comprise information that one message may be used to deliver channel quality information. Then the first message of the UE to the network may include the channel quality information. The first message may comprise e.g. the first message, Random Access (RA) 1, from UE of a Contention Based Random Access Procedure or Non-contention based random access procedure as illustrated in 3GPP TS 36.300 V10.5.0 (2011-09) Technical Specification3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Sections 10.1.5.1 and 10.1.5.2.

In one example, the measurement setup may comprise information that more than one message may be used to deliver channel quality information. Accordingly, even all the messages may be used to deliver channel quality information. Accordingly, in 3GPP TS 36.300 V10.5.0 Section 10.1.5.1, referenced above, both the first, RA 1, and the second message, RA 3, from the UE may include the channel quality information.

In another example, the measurement setup and e.g. information of reference signals associated with each of the transmission points, used in 406, may be received 404 from the network, for example in a System Information Message. The SI message may comprise an SI Block (SIB) including the measurement setup. In this way CoMP may be supported during the access procedure may be supported.

In an embodiment a measurement setup for of the reference signal in may be determined 406 such that CQI information obtained in 406 may be transmitted 408 to the network during the UE accessing the network. This is e.g. prior to step 410 in FIG. 4. For example, as explained above, the channel quality transmitted 408 in a first message during access to the network may indicate that a downlink channel quality measured from a reference signal specific to one or more transmission points gives a sufficient channel quality according to a criterion used at the UE. Then, the message or messages following the first message from the UE during the access to the network may include more detailed information about the channel quality determined in 406. Accordingly, in the embodiment, the measurement setup used to determine 406 CQI from reference signals may be determined on the basis of a total size of a data fields available for carrying CQI in one or more messages from the UE during the access of the UE to the network. In a more detailed example, the total size of data fields available in the messages following the first message that carries the channel quality information in its preamble may be used to determine the measurement setup.

Accordingly, it should be appreciated that during the access to the network, a size of the messages transmitted 408 by the UE may be limited, thereby the amount of CQI information that may be transmitted to the network during the access may be similarly limited.

In an embodiment, a channel quality from one or more transmission points may be determined only when UE access a communications network for example according to the method explained with reference to FIG. 4. Then, a downlink transmission point and an uplink transmission point may be determined for any connection of the UE that follows the accessing, as explained for example in FIG. 3 and steps 308 and 310. Accordingly, when the downlink transmission point of the UE may be determined on the basis of information of channel quality determined by measurement of the UE and conveyed 408 to the network, where an uplink channel quality may be determined 406 on the basis of the conveyed information from the UE, no more channel quality measurements may be necessary after the access to the communications network. This may especially apply, if the downlink and/or uplink radio channel may remain essentially the same, e.g. in case the UE remains in a small area or static, i.e. the UE does not move.

In an embodiment a reference signal may comprise a Channel State Information-Reference Signal (CSI-RS). In another embodiment a reference signal may comprise a Common Reference Signal (CRS). These and further examples of reference signals may be referred to for example 3GPP TS 36.211 V10.3.0 (2011-09), Technical Specification, 3rd Generation Partnership Project; Technical Specification Group Radio Access Network; Evolved Universal Terrestrial Radio Access (E-UTRA); Physical Channels and Modulation, (Release 10), Section 6.10.

In an embodiment, a plurality of messages may be transmitted 408 from the UE during an access procedure. The messages may be received 306 at the network side. The messages may be received via different transmission points, where the UE is synchronized 402 in the communications network. The plurality of transmission points may belong to a same cell or they may belong to different cells. The latter case may happen, when the UE tries to access multiple cells at the same time, e.g. by transmitting the message to each cell at different times.

In an embodiment, there is provided a message of the contention based access procedure that may be transmitted 408 by UE on a plurality of uplink channels to different transmission points. The message may be then used in the network to select an uplink channel of the UE by determining 308 channel qualities of the messages transmitted on the plurality of channels.

In an embodiment, there is provided, a contention based access procedure that includes a plurality of transmitted messages from the user equipment, wherein said transmitted messages include channel quality information.

Now referring to FIG. 6 that illustrates a method of UE accessing a communications network, when the UE is paged, according to an embodiment. The method may be performed by user equipment, when the UE is within a coverage area of at least one transmission point of a plurality of transmission points in a communications network. An example of such the UE is illustrated in FIG. 2.

The method may start in 602 as explained with step 402 of FIG. 4 above.

In 602, a location of the UE may be known by the network. This may be provided by the UE being in a state, where the mobility of the UE may be managed, e.g. by the UE or by the network. In an embodiment the UE may be in an RRC_Idle state, where the mobility of the UE may be managed by the UE, e.g. by transmitting a location update to the network.

In one example, a location of the UE may comprise the location of the UE with an accuracy of one or more eNBs. The location may comprise a tracking area defined by the eNBs, under whose service area the UE may be located.

In 604 the UE may be paged for an incoming call and/or a data transmission. The paging may comprise a transmission point transmitting a paging message on a paging channel to the UE. When the location of the UE comprises a plurality of transmission points, the paging may be transmitted via the plurality of transmission points.

In an embodiment, in 604, a paging message to the UE may comprise an indicator, e.g. a bit, or a field of one or more bits. When the UE receives the paging message, it may determine 606 on the basis of the indicator, whether channel quality information should be included in one or more messages transmitted by the UE during an access procedure to the communications network.

In an embodiment, the paging message may not include an indicator that channel quality information should be included in one or more messages transmitted by the UE during an access procedure, but the UE may determine 606 to include the channel quality information on the basis of the SI received, as explained with reference to step 404 and FIG. 4.

The method may end in 608 after the UE has determined, whether to include channel quality information in one or more messages, transmitted during the access procedure to the communications network.

It should be appreciated, that in the event the UE determines in 606 that access information should be included, the process of FIG. 6 may continue to the process of FIG. 4, where an access procedure according to an embodiment may be performed. Otherwise the UE may determine to perform an access procedure as is conventional and described e.g. in 3GPP TS 36.300 V10.5.0 (2011-09) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), 10.1.5 Random Access Procedure, included herein by reference.

It should be appreciated that in the described embodiments a channel quality indicated by the preamble in the message transmitted by the UE to access the communications network may comprise a preamble or a signature sequence or any other sequence that belongs to a constant amplitude zero autocorrelation codes (CAZAC). One example of such sequences is a Zhadoff-Chu sequence, where multiple sequences may be derived with cyclic shifts of a single sequence.

The functions and/or steps in FIGS. 3, 4, and 6 may be implemented as any kind of processor programmable to execute numeric calculations such as an embedded processor, a Digital Signal Processor (DSP), a Master Control Unit (MCU) or an Application Specific Integrated Processor (ASIP). An apparatus according to an embodiment may also be implemented as an electronic digital computer, which may comprise a working memory (RAM), a central processing unit (CPU) or a processor, and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, constitute the apparatus according to an embodiment described earlier.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or processor or it may be distributed amongst a number of computers or processors.

The steps/points and related functions described above in FIGS. 3, 4, and 6 are in no absolute chronological order, and some of the steps/points may be performed simultaneously or in an order differing from the given one. Other functions can also be executed between the steps/points or within the steps/points, and other signalling messages may be sent between the illustrated messages, and other transmissions of data may be sent between the illustrated transmissions. Some of the steps/points or part of the steps/points can also be left out or replaced by a corresponding step/point or part of the step/point.

The techniques described herein may be implemented by various means so that an apparatus implementing one or more functions described with an embodiment comprises not only prior art means, but also means for receiving a message by a reception point of a communications system, wherein the received message comprises a message of a contention based access procedure indicating channel state information measured at user equipment from a transmission point of a plurality of transmission points.

According to another aspect the techniques described herein may be implemented by various means so that an apparatus implementing one or more functions described with an embodiment comprises not only prior art means, but also means for transmitting a message to a reception point of a communications system, wherein the received message comprises a message of a contention based access procedure indicating a channel state information measured at user equipment from a transmission point of a plurality of transmission points.

More precisely, the various means comprise means for implementing functionality of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It should be appreciated that while some of the above described embodiments may refer to contention based access procedure the above described embodiments may provide improvements also in when applied to a non-contention based access procedure. An example of the contention based access procedure is described e.g. in 3GPP TS 36.300 V10.5.0 (2011-09) Sections 10.1.5.1 referenced above. An example of the non-contention based access procedure is described and 3GPP TS 36.300 V10.5.0 (2011-09) Sections 10.1.5.2.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
    transmitting, by a network node coordinating a communications system of a plurality of transmission points, information on reference signals associated with each of the plurality of transmission points to a user equipment, the information on reference signals includes configuration information for identifying each of the plurality of transmission points;
    receiving a random access procedure message from the user equipment, wherein the random access procedure message comprises an indication of channel quality of a downlink channel for at least one of the plurality of transmission points measured by the user equipment;
    determining, based on the indication of channel quality, at least one transmission point of the plurality of transmission points for a downlink channel;
    determining channel quality of at least one uplink channel based on the received random access procedure message;
    determining, based on the determined channel quality, at least one transmission point of the plurality of transmission points for an uplink channel, and
    establishing a connection according to the determining of the at least one transmission point of the plurality of transmission points for the downlink channel and to the determining the at least one transmission point of the plurality of transmission points for the uplink channel during the random access procedure.

2. The method of claim 1, wherein the determining comprises:
    determining, based on the indication of channel quality, at least one of the following:
    at least one transmission point of the plurality of transmission points for a downlink channel of the user equipment; and
    at least one transmission point of the plurality of transmission points for an uplink channel of the user equipment.

3. The method of claim 1, wherein the reference signals are a group of reference signals and each of the plurality of the transmission points are associated with a specific reference signal from the group.

4. The method of claim 1, wherein the random access procedure message comprises a plurality of messages, a first of the plurality of messages comprising a random access preamble and a second of the plurality of messages being used for contention resolution.

5. The method of claim 1, wherein the indication of the channel quality comprises at least one of the following: an error rate, signal strength, uplink pathloss, channel quality indicator, or a best channel quality indicator.

6. The method of claim 1, wherein the transmitting is carried out directly to the user equipment or via any of the plurality of transmission points.

7. A method comprising:
    receiving, by a user equipment, information on reference signals associated with each of a plurality of transmission points of a communication system coordinated by a network node, the information on reference signals includes configuration information for identifying each of the plurality of transmission points;
    receiving a reference signal from at least one of the plurality of transmission points by using the information;
    determining channel quality of at least one of the plurality of transmission points by measuring the reference signal; and
    transmitting a random access procedure message, wherein the random access procedure message comprises an indication of the determined channel quality of at least one of the plurality of transmission points.

8. The method of claim 7, wherein the random access procedure message comprises a plurality of messages, a first of the plurality of messages comprising a random access preamble and a second of the plurality of messages being used for contention resolution.

9. The method of claim 7, wherein the indication of the determined channel quality comprises at least one of the following: an error rate, signal strength, uplink path-loss, channel quality indicator, or a best channel quality indicator.

10. The method of claim 7, wherein the indication of the determined channel quality comprises a preamble associated with the reference signal associated with the highest channel quality.

11. The method of claim 7, wherein the user equipment is in an idle state with respect to a radio resource connection.

12. An apparatus comprising:
at least one processor; and
at least one memory including computer program code, the at least one memory and the computer program code configured to, with the at least one processor, cause the apparatus at least to:
transmit information on reference signals associated with each of a plurality of transmission points coordinated by the apparatus to a user equipment, the information on reference signals includes configuration information for identifying each of the plurality of transmission points; and
receive a random access procedure message from the user equipment, wherein the random access procedure message comprises an indication of channel quality of a downlink channel for at least one of the plurality of transmission points measured by the user equipment;
determine, based on the indication of channel quality, at least one transmission point of the plurality of transmission points for the downlink channel; and
determine channel quality of at least one uplink channel based on the received random access procedure message;
determine, based on the determined channel quality, at least one transmission point of the plurality of transmission points for an uplink channel, and
establish a connection according to the determining of the at least one transmission point of the plurality of transmission points for the downlink channel and to the determining the at least one transmission point of the plurality of transmission points for the uplink channel during the random access procedure.

13. The apparatus of claim 12, wherein the causing the apparatus to determine comprises causing the apparatus to: determine, based on the indicated channel quality, at least one of the following:
at least one transmission point of the plurality of transmission points for a downlink channel of the user equipment; and
at least one transmission point of the plurality of transmission points for an uplink channel of the user equipment, equipment and establish a connection according to the determining.

14. The apparatus of claim 12, wherein the reference signals are a group of reference signals and each of the plurality of the transmission points are associated with a specific reference signal from the group.

15. The apparatus of claim 12, wherein the random access procedure message comprises a plurality of messages, a first of the plurality of messages comprising a random access preamble and a second of the plurality of messages being used for contention resolution.

16. The apparatus of claim 12, wherein the indication of channel quality comprises at least one of the following: an error rate, signal strength, uplink pathloss, channel quality indicator, or a best channel quality indicator.

17. The apparatus of claim 12, wherein the transmitting information is carried out directly to the user equipment or via any of the plurality of transmission points.

18. An apparatus comprising: at least one processor; and
at least one memory including computer program code, the at least one memory and the computer program code configured to, with the at least one processor, cause the apparatus at least to:
receive information on reference signals associated with each of a plurality of transmission points of a communication system coordinated by a network node,
the information on reference signals includes configuration information for identifying each of the plurality of transmission points;
receive a reference signal from at least one of the plurality of transmission points by using the information;
determine channel quality of at least one of the plurality of transmission points by measuring the reference signal; and
transmit a random access procedure message, wherein the random access procedure message comprises an indication of the determined channel quality of at least one of the plurality of transmission points.

19. The apparatus of claim 18, wherein the random access procedure message comprises a plurality of messages, a first of the plurality of messages comprising a random access preamble and a second of the plurality of messages being used for contention resolution.

20. The apparatus of claim 18, wherein the indication of the determined channel quality comprises at least one of the following: an error rate, signal strength, uplink path-loss, channel quality indicator, or a best channel quality indicator.

21. The apparatus of claim 18, wherein the indication of the determined channel quality comprises a preamble associated with the reference signal associated with a highest channel quality.

22. The apparatus of claim 18, wherein the apparatus is in an idle state with respect to a radio resource connection.

23. The method of claim 1 wherein the information on reference signals comprises configuration information that identifies a reference signal associated with each of the plurality of transmission points.

24. The method of claim 1 wherein the transmitting comprises:
transmitting, by a first transmission point of the plurality of transmission points,
information on reference signals associated with each of the plurality of transmission points to a user equipment, the information on reference signals including configuration information that identifies a reference signal associated with each of the plurality of transmission points, including information identifying a reference signal associated with the first transmission point and information identifying a reference signal associated with at least one other transmission point of the plurality of transmission points.

* * * * *